E. F. COLLINS.
THERMO ELECTRIC REGULATOR.
APPLICATION FILED OCT. 15, 1913.

1,121,979.

Patented Dec. 22, 1914.

2 SHEETS—SHEET 1.

Witnesses:
Earl G. Klock.
J. Ellis Glen

Inventor:
Edgar F. Collins,
by Albert G. Davis
His Attorney.

E. F. COLLINS.
THERMO ELECTRIC REGULATOR.
APPLICATION FILED OCT. 15, 1913.

1,121,979.

Patented Dec. 22, 1914.

2 SHEETS—SHEET 2.

Witnesses:
Earl G. Klock
J. Ellis Glen

Inventor:
Edgar F. Collins,
by
His Attorney.

UNITED STATES PATENT OFFICE.

EDGAR F. COLLINS, OF SCHENECTADY, NEW YORK, ASSIGNOR TO GENERAL ELECTRIC COMPANY, A CORPORATION OF NEW YORK.

THERMO-ELECTRIC REGULATOR.

1,121,979.  Specification of Letters Patent.  Patented Dec. 22, 1914.

Application filed October 15, 1913. Serial No. 795,363.

*To all whom it may concern:*

Be it known that I, EDGAR F. COLLINS, a citizen of the United States, residing at Schenectady, county of Schenectady, State of New York, have invented certain new and useful Improvements in Thermo-Electric Regulators, of which the following is a specification.

The present invention relates to the control of electrically heated devices, such, for example, as resistance furnaces, from which the amount of heat drawn varies with the service conditions. The temperature of a device of this nature has been controlled by inserting and withdrawing external resistance in the heating circuit, but this method of heat control is too wasteful of energy to be useful for industrial purposes.

In accordance with my invention the temperature of a heating device is maintained within narrow predetermined limits by continuously shifting the rate of energy supply from one value to another, without the use of an external resistance the rate of heat input being alternately less than or greater than the rate of input required to make up for the losses and the length of the periods of the cycle being varied in accordance with the demand in response to resistance changes in the heater. For example, sections of the heater may be connected alternately in series and in parallel, or, the supply voltage may oscillate between a low and a high value which if continued would be on the one hand insufficient to supply the necessary heat, and on the other hand would overheat the device.

My invention also includes suitable control apparatus for carrying out this cycle, as pointed out with particularity in the appended claims.

Figure 1:
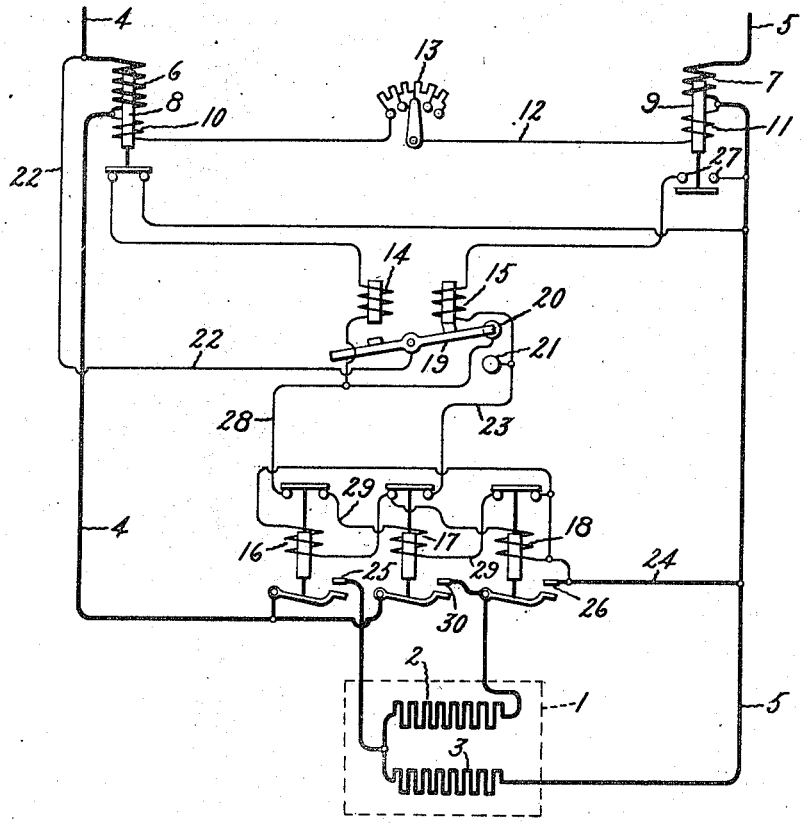
Figure 2:
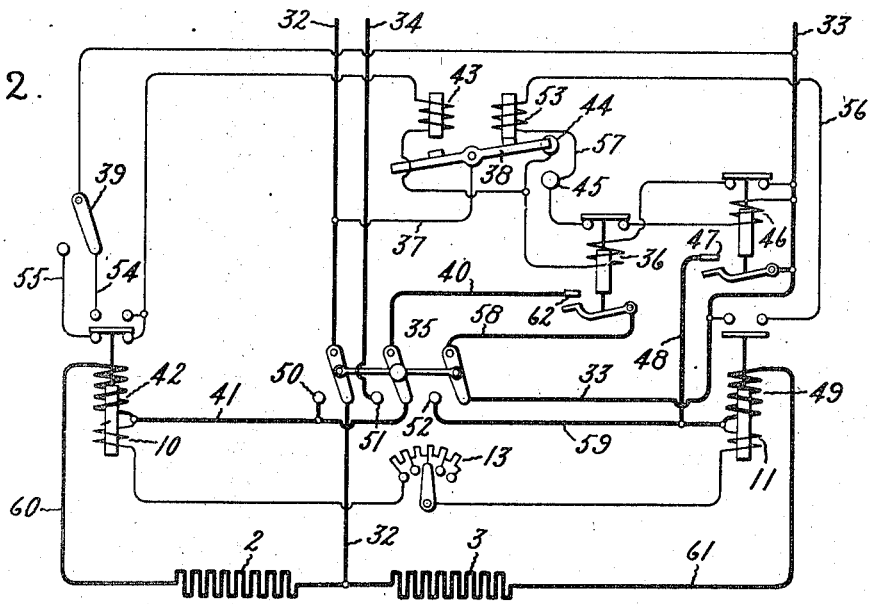
Figure 3:
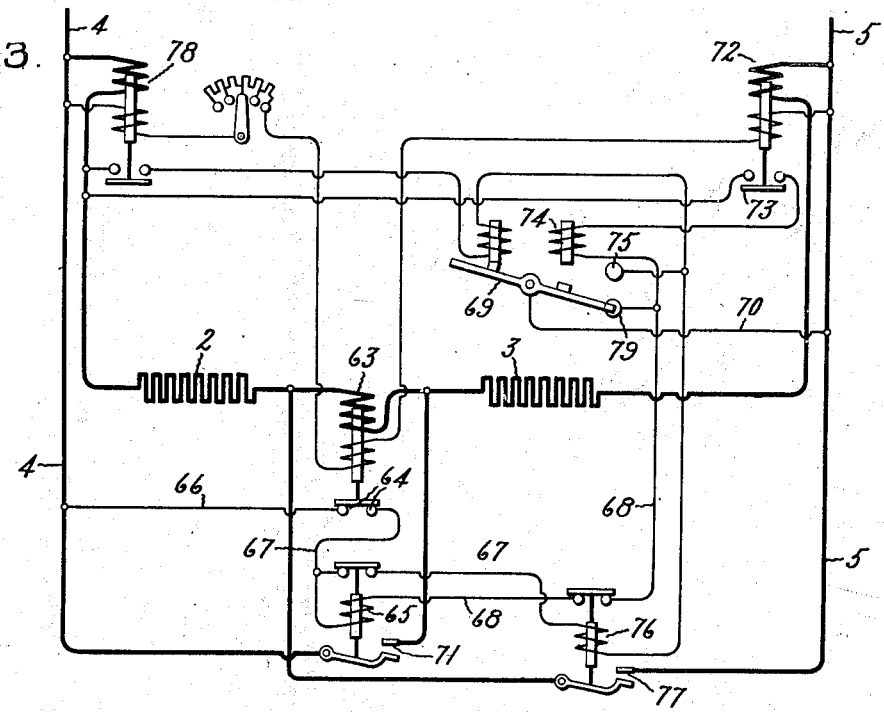
Figure 4:
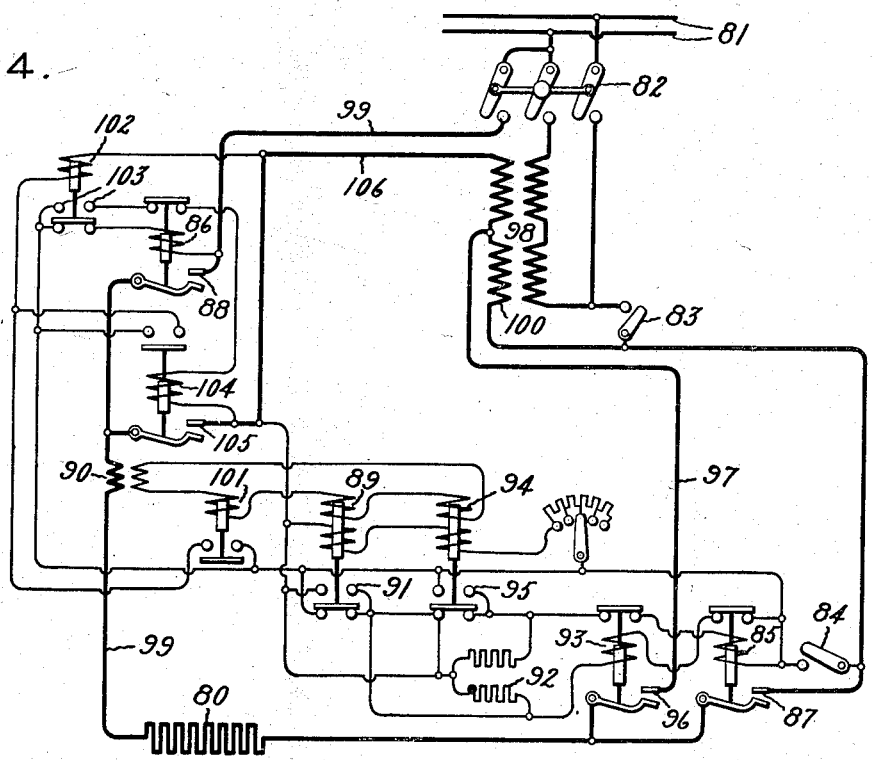

My invention will be more fully understood by reference to the following description taken in connection with the accompanying drawings which illustrate diagrammatically various systems of connection for controlling the temperature of a furnace, or other heating device: Figure 1 illustrating a system in which two resistors are alternatively connected in parallel and in series to the heating circuit in accordance with the heat demand; Fig. 2 illustrates a system in which two voltages are used; Fig. 3 illustrates a system in which two resistors are used, connected to the supply alternately with an intermediate series connection; and Fig. 4 illustrates an alternating current system adapted for use with automatic multiple voltage control.

Referring to Fig. 1 the resistance furnace, or other heating device, has been diagrammatically indicated in outline by dotted lines 1, and two resistors 2 and 3 are shown. These resistors preferably consist of carbon in its various forms which has a negative temperature resistance coefficient although my invention is not limited to any particular type of resistance material, and may be well adapted to resistances having a positive thermal coefficient of resistance. Energy is fed to the furnace by supply conductors 4 and 5, in series with which is an underload magnetic control coil 6, and an overload control coil 7. The cores 8 and 9 of these coils are also surrounded by opposing or assisting shunt coils 10 and 11 connected in series across the supply lines by conductor 12 through a resistance 13. By varying the resistance 13 the opposing or assisting effect of the shunt coils 10 and 11 may be varied, thereby varying the current value at which the underload coil 6 and overload coil 7 will operate. These opposing or assisting coils have been used in all the modifications of the control system shown and need not be again described.

As will be more fully explained, the underload and overload coils change the connection of resistors 2 and 3 by means of relay coils 14 and 15, and contactor coils 16, 17 and 18 alternately from series to parallel. Assuming a parallel connection, the temperature of the furnace will rapidly increase, thereby increasing the conductivity of the carbon resistors, and thus increasing the current value until the limit at which the overload control coil 7 is set is reached. This will cause the overload coil to change the connection from parallel to series, thus greatly cutting down the current and allowing the furnace to cool somewhat. As it cools the resistance rises, still further decreasing the supply current and causing the underload coil 6 to change the connection back to parallel.

When current is first impressed upon the furnace magnet 14 is energized, its armature is attracted causing switch arm 19 to shift from contact 20 to contact 21. This completes a circuit from line 4 through conductor 22, switch arm 19, conductor 23, contactor coil 16 and 18 and conductors 24 to the other supply line 5. Contactor coils 16 and 18 will pull up their armatures and close contacts 25 and 26 placing the resistors 2 and 3 in parallel across the source of current supply. Undercoil 6 will pull up its armature without effect on the connection, and the current will increase until overload coil 7 pulls up its armature bridging the contacts 27. This energizes relay 15, shifts the switch arm 19 to contact 20, thereby deenergizing contactors 16 and 18, completing a circuit through contactor coil 17 by conductors 28, 29 and 24, closing the contact 30 and connecting the resistance 2 and 3 in series to the supply lines. The value of the impressed voltage and the resistance of the heaters 2 and 3 should be so chosen that this cycle will be repeated at an interval of several seconds, or minutes, depending on the heat storage capacity of the furnace and the closeness of regulation desired. The length of the periods of parallel and series connection with respect to each other thus are varied in accordance with the heat demand of the furnace. A somewhat similar cycle is carried out in the system shown in Fig. 2. Energy in this case is supplied from a three-wire or two voltage system; the higher voltage being applied across conductors 32 and 33 and the lower voltage across conductors 33 and 34 on the one hand and 32 and 34 on the other hand. In order to heat up the furnace rapidly, it is started with the high voltage applied alternately on grids 2 and 3, with the triple pole switch 35 in the position as shown in the drawing. At the beginning of the operation, relay 43 is energized, shifting the switch arm 38 to the contact 45, completing a circuit through the contactor magnet 46, through conductors 37 and switch 38. The contact 47 will close, completing a circuit from supply line 33 to conductors 48 and 59, overload coil 49 to the heater 3, the latter being connected to the other side 32 of the supply line. This will cause the furnace to heat up rapidly. When a predetermined temperature has been attained, the overload coil 49 operates, completing the circuit from line 33 through conductors 56, relay coil 53, conductor 57, the switch 38 and the conductors 37 to the line 32, thereby shifting the connection of switch arm 38 from contact 45 to contact 44. This causes the contactor 46 to be deenergized and the contactor coil 36 to be energized, opening contact 47 and closing contact 62. Current now flows from supply line 33 through conductors 58, 40, 41, underload coil 42, conductor 60 through the heater 2 to supply line 32. The main connections now are shifted by moving the triple pole switch 35 to contact points 50, 51 and 52, and shifting switch 39 from conductor 54 to conductor 55. This connects the resistors 2 and 3 in series across supply line 32 and 33. The resistors are now in series but still supplied by current at a higher voltage than necessary to maintain the desired temperature. When by the decrease of resistance a current has increased to a predetermined value, the overload coil 49 will close, operate the relay coil 53, and energize contactor coil 36. This completes a circuit from the lower voltage supply through both resistors 2 and 3, namely, from line 34, conductors 40, 58, 59, 61 on the one terminal, and the conductors 60 and 41 to the line 32, at the other terminal. The furnace will now be insufficiently heated and will cool off, until the underload coil 42 restores connections to the higher voltage supply lines 32, 33 in the manner already described.

In the system shown in Fig. 3, when the circuit is completed the resistors 2 and 3 originally are in series, and the underload magnet 63 will bridge contacts 64. A circuit is thus established through contactor magnet 65 from supply line 4 through conductors 66, 67 and 68, switch arm 69, and conductor 70 to the other supply line 5. The contact 71 will close, placing resistor 3 across the source of current supply and causing the furnace to heat up rapidly. Due to the increase in temperature and decrease of resistance, the heating current will increase until the overload magnet 72 operates to bridge contact 73 thereby energizing relay magnet 74. The switch 69 will shift to contact 75, deënergizing contactor magnet 65. By the opening of contacts 71 the two grids are placed in series, the underload coil 63 will attract its armature and open the circuit across contact 64. Coils 2 and 3 will continue to operate in series until the heating current is decreased to the predetermined value at which magnet 63 operates. When this happens the coil 76 will be energized and the resistor 2 connected across the supply circuit by the closure of contacts 77. When the heating current is again increased to the predetermined limit the overload coil 78 will operate to shift connection of the switch arm 69 to contact 79, but again the resistors 2 and 3 will be placed in series before the circuit through contactor magnet 65 is established. In this manner the heaters 2 and 3 are connected alternately across the heating circuit with an intermediate series connection, the intervals being lengthened or shortened automatically to maintain the desired temperature.

In the system shown in Fig. 4 a single heater 80 is supplied with alternating current and provision is made to vary the voltage of the supply current between predetermined limits during normal operation. At the start the heating device may be brought to the required temperature rapidly by placing the full voltage across lines 81, which we may assume to be 400 volts, across the heater by the closure of switches 82, 83 and 84. This operation will cause the circuit to be completed through the contactor magnets 85 and 86, resulting in a closure of contacts 87 and 88 and thereby making the desired connections. When the heating current is increased to a predetermined value the control magnet 89 will operate. This magnet receives current from a series transformer 90 and is thus responsive to the changes in heating current. It acts to close contacts 91, short circuiting resistances 92 in series with the contactor magnet 93. As the current continues to increase the magnet 94 will operate, closing contacts 95. This short circuits contactor magnet 85, energizing contactor coil 93 which closes the contact 96. The grid is then connected by means of conductor 97 to an intermediate point upon the secondary of transformer 98, and by conductor 99 to one terminal of the source of alternating current supply. This places an opposing section 100 of the secondary winding of the transformer in circuit and gives the supply voltage in a given case of 330 volts upon the heater terminals. As the current continues to rise, due to an increase of temperature of the heating device, relay magnet 101 closes its contacts which completes a circuit through magnet 102, closing contacts 103 and deënergizing magnet 86. The control magnet 104 operates, closing the contacts 105 and placing the heater 80 across the terminals of one-half of the transformer secondary by means of conductors 97 and 106, which in a given case supplies current at 110 volts. This voltage is insufficient to maintain the temperature of the furnace, causing the resistance of the heater to rise somewhat until the coils 89, 94 and 101 drop out, the contacts 96 open and the contacts 87 close, placing the full secondary voltage of 220 volts across the heater terminals. This causes the temperature of the heating device again to rise and to repeat the cycle.

By means of any of the control systems above described I have in practice maintained the temperature of resistance furnaces provided with a granular carbon heater and having considerable heat storage capacity, within about 25° C., at the temperature of incandescent carbon.

The furnace can be readily used for forging bar copper and steel.

It will be observed that the control is entirely automatic and no energy is wasted in an external resistance, that the operation of the control mechanism is positive, and that no special source of energy is required. A furnace of rugged construction may be used, and the service may be widely variable without danger of overheating.

What I claim as new and desire to secure by Letters Patent of the United States is:—

1. The combination of an electric heating device from which heat is emitted at varying rates, a heater therefor, an energy supply circuit, connections directly between said heater and said supply circuit, and switching means responsive to a predetermined change in the resistance of said heater for shifting said connections of the heating circuit with respect to the heater to vary the relation between the voltage of the current in the supply circuit and the resistance of the heater.

2. The combination of an electric furnace, a heater therein, a plurality of circuits supplying current at different voltages, and an electro-magnetic switch responsive to changes of resistance of said heater by variation of current respectively above and below predetermined limits for changing at intervals the connections to said heater from one supply circuit to another to maintain the temperature of said furnace within predetermined limits.

3. The combination of an electric heating device, a resistor therefor, a heating circuit connected to said resistor, and electromagnetic means responsive to a change in the electrical resistance of said resistor for periodically shifting the connections between the resistor and the heating circuit to substantially vary the energy input during intervals the length of which depends on the rate of heat demanded.

4. A combination of an electric heating device, a resistance heater therefor, heating circuits of materially different voltage, an electro-magnet in series with said heater operating when the current value reaches a predetermined maximum, a second electromagnet in series with said heater operating when the heating current reaches the predetermined minimum, and means operatively connected to said magnets for changing the connections of said heater from one heating circuit to the other to increase the energy input when the magnet responsive to the low current value operates and to decrease the energy input when the magnet responsive to the high current value operates.

5. The combination of a source of electrical energy, an energy consuming circuit having a marked resistance coefficient of temperature, and electro-magnetic means responsive to variations of current in said circuit above and below predetermined values for periodically alternating the energy input of said circuit between predetermined values, and means for absorbing and utilizing substantially all of the heat produced in said energy consuming circuit.

In witness whereof, I have hereunto set my hand this 14th day of October, 1913.

EDGAR F. COLLINS.

Witnesses:
 BENJAMIN B. HULL,
 MAX WEISBROD.